(12) United States Patent
Iwamoto

(10) Patent No.: US 9,129,423 B2
(45) Date of Patent: Sep. 8, 2015

(54) IMAGE PROCESSING APPARATUS

(71) Applicant: Oki Data Corporation, Minato-ku, Tokyo (JP)

(72) Inventor: Takara Iwamoto, Tokyo (JP)

(73) Assignee: Oki Data Corporation, Tokyo (JP)

( * ) Notice: Subject to any disclaimer, the term of this patent is extended or adjusted under 35 U.S.C. 154(b) by 184 days.

(21) Appl. No.: 13/901,119

(22) Filed: May 23, 2013

(65) Prior Publication Data
US 2013/0315482 A1    Nov. 28, 2013

(30) Foreign Application Priority Data

May 28, 2012  (JP) .................... 2012-120743

(51) Int. Cl.
*G06K 9/00* (2006.01)
*G06T 11/00* (2006.01)
*H04N 1/62* (2006.01)

(52) U.S. Cl.
CPC ............ *G06T 11/001* (2013.01); *H04N 1/62* (2013.01)

(58) Field of Classification Search
None
See application file for complete search history.

(56) References Cited

U.S. PATENT DOCUMENTS

| 5,245,417 | A * | 9/1993 | Hibi et al. ............. 358/515 |
| 6,546,132 | B1 * | 4/2003 | Bhattacharjya et al. ...... 382/167 |
| 7,551,334 | B2 * | 6/2009 | Li ......................... 358/518 |
| 7,843,616 | B2 * | 11/2010 | Li ......................... 358/518 |
| 2002/0025068 | A1 * | 2/2002 | Mishima ............ 382/166 |
| 2002/0136452 | A1 * | 9/2002 | Schroder ........... 382/165 |
| 2002/0159080 | A1 * | 10/2002 | Feng et al. .......... 358/1.9 |
| 2009/0147326 | A1 * | 6/2009 | Matsuzaki ......... 358/518 |
| 2009/0244560 | A1 * | 10/2009 | Li .......................... 358/1.9 |
| 2011/0305391 | A1 * | 12/2011 | Kunkel et al. .... 382/167 |

FOREIGN PATENT DOCUMENTS

JP       2001-320598 A    11/2001

* cited by examiner

*Primary Examiner* — Utpal Shah
*Assistant Examiner* — Narek Zohrabyan
(74) *Attorney, Agent, or Firm* — Panitch Schwarze Belisario & Nadel LLP

(57) ABSTRACT

An image processing apparatus includes an image input unit for inputting color image data, a first color conversion unit for converting the inputted color image data into first image data of the L*a*b color space having independently brightness component and chromaticity component, a background detection unit for detecting a background color component from the converted first image data of the L*a*b color space, a background removing unit for converting, based on a white value conversion parameter derived based on a ratio of the background color corresponding to the background component to a prescribed reference white color in the L*a*b color space, the first image data into second image data having the background color in white, a second color conversion unit for converting the second image data of the L*a*b color space into third image data of a prescribed color space, and an output unit for outputting the converted third image data of the prescribed color space.

13 Claims, 11 Drawing Sheets

FIG.7
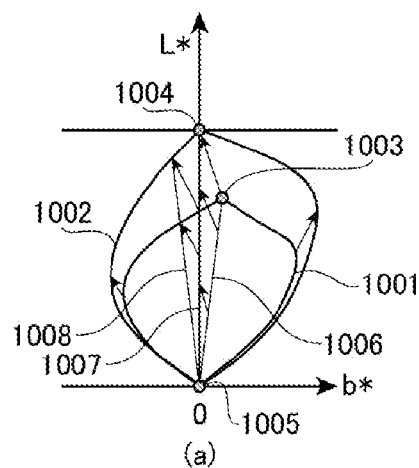
(a)
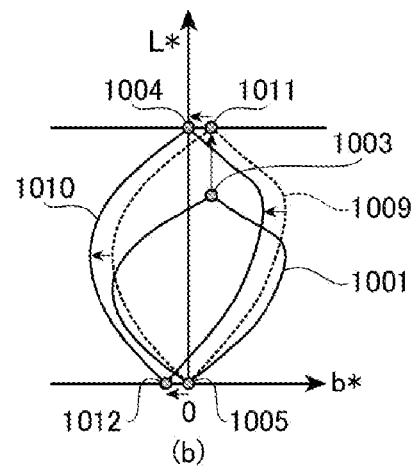
(b)
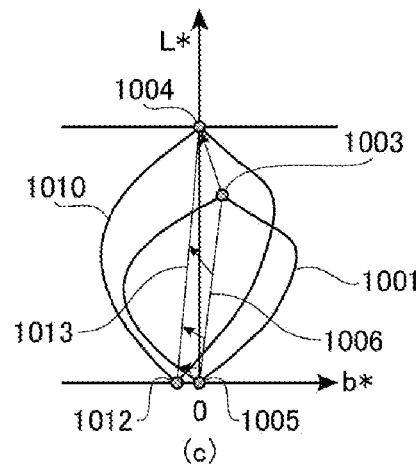
(c)

| SCANNING DATA | | | | WHITE COLOR VALUE CONVERSION | | | | UNIFORM CONVERSION | | | |
|---|---|---|---|---|---|---|---|---|---|---|---|
| PATCH | L | a | b | PATCH | L | a | b | PATCH | L | a | b |
| 1101 | 90 | 0 | 8 | 1121 | 100 | 0 | 0 | 1131 | 100 | 0 | 0 |
| 1102 | 90 | 0 | 0 | 1122 | 95 | 0 | -10 | 1132 | 100 | 0 | -8 |
| 1103 | 60 | 0 | 0 | 1123 | 62 | 0 | -6 | 1133 | 66 | 0 | -8 |
| 1104 | 30 | 0 | 0 | 1124 | 31 | 0 | -3 | 1134 | 33 | 0 | -8 |
| 1105 | 0 | 0 | 0 | 1125 | 0 | 0 | 0 | 1135 | 0 | 0 | -8 |
| 1106 | 90 | 0 | 8 | 1126 | 100 | 0 | 0 | 1136 | 100 | 0 | 0 |
| 1107 | 60 | 0 | 5 | 1127 | 66 | 0 | 0 | 1137 | 66 | 0 | -3 |
| 1108 | 30 | 0 | 2 | 1128 | 33 | 0 | 0 | 1138 | 33 | 0 | -6 |
| 1109 | 0 | 0 | 0 | 1129 | 0 | 0 | 0 | 1139 | 0 | 0 | -8 |

IMAGE PROCESSING APPARATUS

CROSS REFERENCE TO RELATED APPLICATION

This application claims priority benefits under 35 USC, section 119 on the basis of Japanese Patent Application No. 2012-120743, the disclosure of which is incorporated herein by reference.

BACKGROUND OF THE INVENTION

1. Field of the Invention

This invention relates to an image processing apparatus removing a background color contained in color image data.

2. Description of Related Art

Image processing technology has been known in which image data are corrected upon conversion from color space of such as, e.g., RGB or CMYK as device-depending color to color space of, such as, e.g., CIEXYZ as a color mode of device-independent color. With such technology, a correction of the whole color space in maintaining its color balance is made upon white point conversion from the XYZ value of a certain reference color (e.g., white color displayed on a monitor) to the XYZ value of another reference color (e.g., white color of printing medium).

With such image processing technology, Japanese Patent Application Publication No. 2001-320598 has a description on a color correction apparatus correcting color to be outputted to an output device in accordance with light of an environment at which a monitor or printing medium is located.

In modern image processing technology, however, image processing is made at CIEL*a*b* color space as a type of uniform color space in which components of the brightness and chromaticity (colorfulness) are independent in color models representing color space and in which differentials of numerical values are close to human's perception, and background removing processing has been known as a representative art.

The background removing processing generally includes processing to convert the brightness value L* of the background component corresponding to the background color into the maximum value and to make the value of the chromaticity a*b* closer to zero, thereby rendering the background color the white color as the achromatic color of the brightest brightness.

This method, however, raises a problem that distortions and deviations may occur in color space of corrected results thereby to lose color balance, because the L* value, a* value, and b* value of the background color component are corrected in the same way to pixels forming the components other than components of the background color.

SUMMARY OF THE INVENTION

In consideration of such a situation, it is an object of the invention to provide an image processing apparatus capable of background color removing processing for reducing distortions and deviations in the color space and for rarely losing the balance in image processing in CIEL*a*b* color space.

The foregoing objects are accomplished with an image processing apparatus including: an image input unit for inputting color image data; a first color conversion unit for converting the inputted color image data into first image data of the L*a*b color space having independently brightness component and chromaticity component; a background detection unit for detecting a background color component from the converted first image data of the L*a*b color space; a background removing unit for converting, based on a white value conversion parameter derived based on a ratio of the background color corresponding to the background component to a prescribed reference white color in the L*a*b color space, the first image data into second image data having the background color in white; a second color conversion unit for converting the second image data of the L*a*b color space into third image data of a prescribed color space; and an output unit for outputting the converted third image data of the prescribed color space.

In accordance with the invention, the image processing apparatus is capable of background color removing processing for reducing distortions and deviations in the color space and for rarely losing the balance in image processing in CIEL*a*b* color space.

BRIEF DESCRIPTION OF DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings:

FIGS. 7(a) to (c) are diagrams showing examples of changes in color space between pre-processing and post-processing with respect to background removing processing using the white color value conversion and with respect to background removing processing done by a conventional uniform conversion of a Lab value;

DETAILED DESCRIPTION OF EMBODIMENTS

Figure 1:
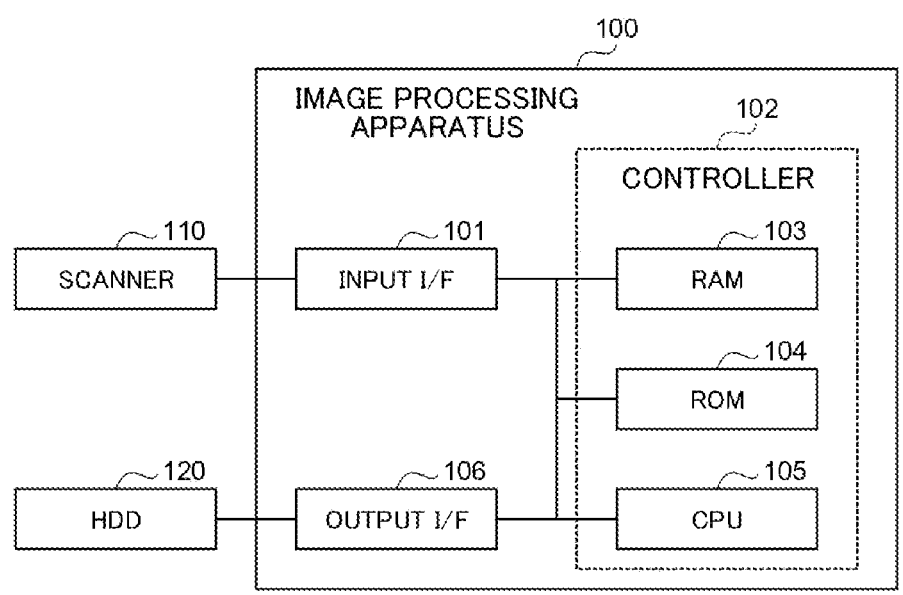
FIG. 1 is a schematic diagram illustrating the entire structure of an image processing apparatus according to the a first embodiment of the invention.

Referring to the drawings, an embodiment according to the invention is described. This invention, however, is not limited to what is described below, and can be modified as far as not deviated from the subject matters of the invention.

First Embodiment

FIG. 1 is a schematic diagram showing the whole structure of an image processing apparatus 100 according to the first embodiment of the invention. The image processing apparatus 100 includes an input interface (I/F) 101, a controller 102, and an output interface (I/F) 106.

The input interface 101 is structured to be connectable to external devices via electrical signal lines, such as LAN (Local Area Network) cables, USB (Universal Serial Bus) cables, etc. and retrieves image data from the external devices. In this embodiment, the input interface 101 is connected to a scanner 110 capable of producing color image data by reading images formed on original documents, as an external device. The input interface 101 retrieves color image data represented with RGB color component values of three colors (hereinafter, referred to as "RGB image data") at each pixel produced at the scanner 110.

The controller 102 includes a RAM (Random Access Memory) 103 as a volatile memory, a ROM (Read Only Memory) 104 as a non-volatile memory, and a CPU (Central Processing Unit) 105, and controls integrally operation such as temporary memorizing of the color image data, operation and execution of image processing programs, etc.

The output interface 106 is structured to be connectable to external devices via electrical signal lines, such as LAN cables, USB cables, parallel ATA (Advanced Technology Attachment) cables, serial ATA cables, etc. and outputs the processed color image data to the external devices. In this embodiment, the output interface 106 is coupled to a HDD (Hard Disk Drive) 120 magnetically writable of the color image data as an external device.

Figure 2:
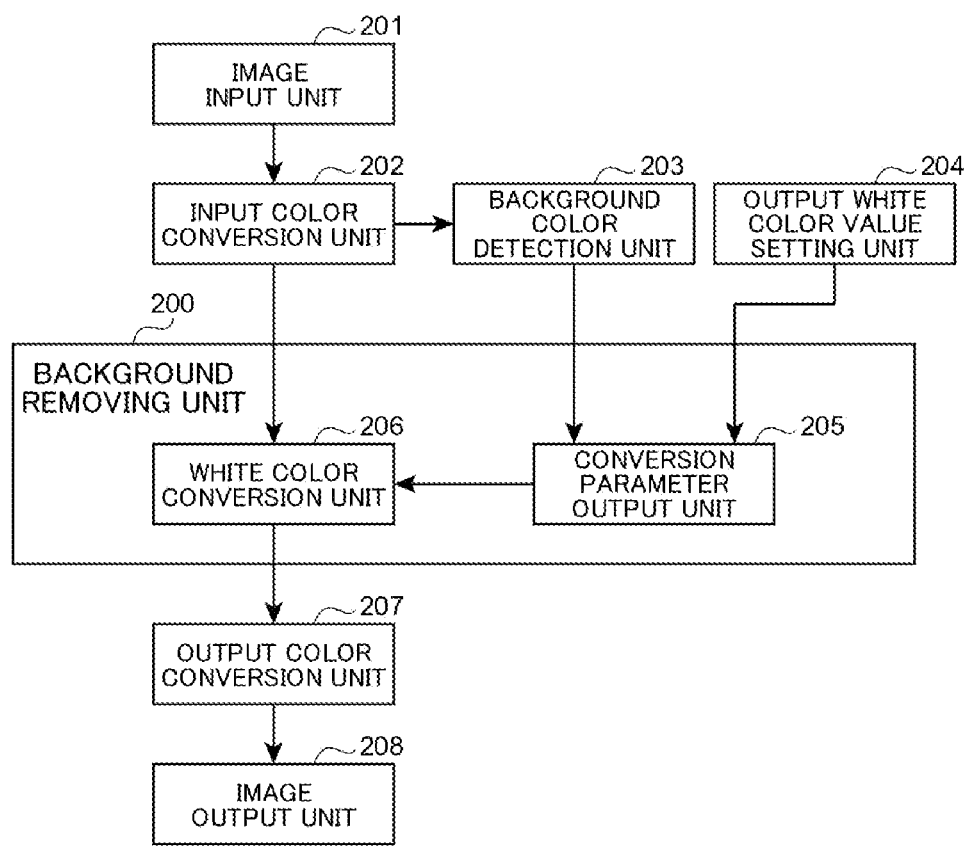
FIG. 2 is a functional block diagram showing functions of the image processing apparatus according to the first embodiment.

FIG. 2 is a functional block diagram showing functions of the image processing apparatus 100 according to the first embodiment. Communication mechanisms at each unit and operation for writing control and image processing are realized by the CPU 105 in the controller 102 upon execution of the programs stored in the ROM 103 while rendering the RAM 104 a working memory.

An image input unit 201 retrieves or inputs the RGB image data from the scanner 110 via the input interface 101. In this embodiment, the image input unit 201 is explained as retrieving the RGB image data from the scanner 110, but the image input unit 201 may retrieve the RBG data from, e.g., a memory medium connected to a PC (personal computer) or a network, a handy memory device such as USB memory stick or the like, etc. The image input unit 201 renders the RAM 103 memorize the inputted RGB image data.

The input color conversion unit 202 serving as a first color conversion unit converts the RBG image data memorized in the RAM 103 into CIEL*a*b* (hereinafter referred simply to as "Lab") image data, serving as a first image data, a type of a uniform color space in which components of the brightness and chromaticity (colorfulness) are independent. In this embodiment, a three-dimensional look-up table is produced in advance for outputting an output Lab value corresponding to a combination of R, G, and B of the retrieved RBG image data, and the input color conversion unit 202 reads the respective RBG values of the RBG image data and converts the data into the corresponding Lab values upon referring to the three-dimensional look-up table. As such a converting method of the color space using a three-dimensional look-up table, a method set forth in, e.g., Japanese Patent Application Publication No. Hei 9-207389 as a prior art document can be used. The input color conversion unit 202 outputs the Lab image data to a background color detection unit 203 and to a white color conversion unit 206 in a background removing unit 200.

The background color detection unit 203 refers to the Lab image data obtained through the conversion at the input color conversion unit 202, detects a background color Lab value ($L_{ws}$, $a_{ws}$, $b_{ws}$) as the background color component in the Lab image data from a detecting method described below, and outputs the detected background color Lab value ($L_{ws}$, $a_{ws}$, $b_{ws}$) to the conversion parameter output unit 205 of the background removing unit 200.

An output white color value setting unit 204 sets a white color Lab value ($L_{wd}$, $a_{wd}$, $b_{wd}$) as a conversion result where the background color Lab value detected at the background color detection unit 203 is converted at the background removing unit 200. In this embodiment, because the output value is of the RGB image data, the white color Lab value ($L_{wd}$, $a_{wd}$, $b_{wd}$) is set to (100, 0, 0) in which the L value indicates the maximum value while the a value and the b value indicate an achromatic color. The output white color value setting unit 204 outputs the determined white color Lab image data to the conversion parameter output unit 205 of the background removing unit 200.

The background removing unit 200 includes the conversion parameter output unit 205 serving as the output unit for outputting the conversion parameters for white point or white value conversion in the Lab color space, and a white conversion unit 206 executing the white color conversion of the Lab image data.

In this invention, the background removing unit 200 prevents the color balance from losing due to the conversion, by making possible the white value conversion in the Lab color space.

For example, in a light source conversion for correcting visual color differences between a light source S and a light source D, the conversion is made with following Formula 1, Formula 2, and Formula 3 using a ratio of the white color value ($X_{ws}$, $Y_{ws}$, $Z_{ws}$) of the light source S to the white color value ($X_{wd}$, $Y_{wd}$, $Z_{wd}$) of the light source D, in a case that, in the CIEXYZ (hereinafter simply referred to as "XYZ") color space as a color model of a device-independent color, the XYZ value ($X_D$, $Y_D$, $Z_D$) at the light source D is derived from the XYZ value ($X_S$, $Y_S$, $Z_S$) at the light source S.

$$X_D = \frac{X_{wd}}{X_{ws}} X_S \qquad \text{FORMULA 1}$$

$$Y_D = \frac{Y_{wd}}{Y_{ws}} Y_S \qquad \text{FORMULA 2}$$

$$Z_D = \frac{Z_{wd}}{Z_{ws}} Z_S \qquad \text{FORMULA 3}$$

In this embodiment, thoughts on the white color value of the above-mentioned light source conversion are applicable, because the component value corresponding to the background color of the image data is converted into a value of the white color as a reference.

Conversion formulas between the XYZ space and the Lab space are given with following forward conversion formulas of Formula 4, Formula 5, and Formula 6, and the following reverse conversion formulas of Formula 7, Formula 8, and Formula 9, using the white color value ($X_O$, $Y_O$, $Z_O$) of a standard white light source O.

$$L = 116\left(\frac{Y}{Y_O}\right)^{1/3} - 16 \quad \text{FORMULA 4}$$

$$a = 500\left\{\left(\frac{X}{X_O}\right)^{1/3} - \left(\frac{Y}{Y_O}\right)^{1/3}\right\} \quad \text{FORMULA 5}$$

$$b = 200\left\{\left(\frac{Y}{Y_O}\right)^{1/3} - \left(\frac{Z}{Z_O}\right)^{1/3}\right\} \quad \text{FORMULA 6}$$

$$X = X_O\left(\frac{a}{500} + \frac{L+16}{116}\right)^3 \quad \text{FORMULA 7}$$

$$Y = Y_O\left(\frac{L+16}{116}\right)^3 \quad \text{FORMULA 8}$$

$$Z = Z_O\left(\frac{L+16}{116} - \frac{b}{200}\right)^3 \quad \text{FORMULA 9}$$

In a case where the white conversion that the background color Lab value ($L_{ws}$, $a_{ws}$, $b_{ws}$) detected at the background color detection unit 203 is converted into the white color Lab value ($L_{wd}$, $a_{wd}$, $b_{wd}$), is made to the Lab image data, a large amount of conversion operations between the XYZ color space and the Lab color space is inevitable. More specifically, the XYZ values of the background color Lab value ($L_{ws}$, $a_{ws}$, $b_{ws}$) and the white color Lab value ($L_{wd}$, $a_{wd}$, $b_{wd}$) are sought as the background color XYZ value ($X_{ws}$, $Y_{ws}$, $Z_{ws}$) and the white color XYZ value ($X_{wd}$, $Y_{wd}$, $Z_{wd}$), respectively, as utilizing Formulas 7 to 9. After the XYZ value (Xs, Ys, Zs) of the Lab value (Ls, as, bs) of the Lab image data is sought in substantially the same way, a corrected XYZ value ($X_D$, $Y_D$, $Z_D$) is derived using the white color conversion formulas, Formula 1, Formula 2, and Formula 3, and a corrected Lab value ($L_D$, $a_D$, $b_D$) is sought. Thus, mutual conversions between the XYZ color space and the Lab color space provide many complicated calculations such as exponentiations and roots of third power, etc.; for example, operation of the white color ratio includes multiplications of twenty-four (24) times and divisions of sixteen (16) times; the operation for each pixel includes multiplications of eighteen (18) times, divisions of ten (10) times, and cubic root operations of five (5) times, so that the operation requires a large amount of time and mounting costs.

Therefore, in this invention, it derives operation formulas to directly seek the corrected Lab value ($L_D$, $a_D$, $b_D$) from the Lab value (Ls, as, bs) of the Lab image data, thereby solving the above problems.

More specifically, in accordance with Formulas 4 to 6, the corrected Lab value ($L_D$, $a_D$, $b_D$) is represented from the following Formulas 10 to 12.

$$L_D = 116\left(\frac{Y_D}{Y_O}\right)^{1/3} - 16 \quad \text{FORMULA 10}$$

$$a_D = 500\left\{\left(\frac{X_D}{X_O}\right)^{1/3} - \left(\frac{Y_D}{Y_O}\right)^{1/3}\right\} \quad \text{FORMULA 11}$$

$$b_D = 200\left\{\left(\frac{Y_D}{Y_O}\right)^{1/3} - \left(\frac{Z_D}{Z_O}\right)^{1/3}\right\} \quad \text{FORMULA 12}$$

Herein, Formulas 13 to 15 are obtained from Formulas 1 to 3.

$$L_D = 116\left(\frac{1}{Y_O}\frac{Y_{wd}}{Y_{ws}}Y_s\right)^{1/3} - 16 \quad \text{FORMULA 13}$$

$$a_D = 500\left\{\left(\frac{1}{X_O}\frac{X_{wd}}{X_{ws}}X_s\right)^{1/3} - \left(\frac{1}{Y_O}\frac{Y_{wd}}{Y_{ws}}Y_s\right)^{1/3}\right\} \quad \text{FORMULA 14}$$

$$b_D = 200\left\{\left(\frac{1}{Y_O}\frac{Y_{wd}}{Y_{ws}}Y_s\right)^{1/3} - \left(\frac{1}{Z_O}\frac{Z_{wd}}{Z_{ws}}Z_s\right)^{1/3}\right\} \quad \text{FORMULA 15}$$

Where the values of $X_{WS}$, $X_{Wd}$, $X_S$, $X_{WS}$, $X_{Wd}$, $X_S$, $X_{WS}$, $X_{Wd}$, $X_S$ of Formulas 13 to 15 are converted using Formulas 7 to 9 and are summarized, following Formulas 16 to 18 are obtainable.

$$L_D = C_0(L_S+N)-N \quad \text{FORMULA 16}$$

$$a_D = C_1 a_S + C_2(L_S+N) \quad \text{FORMULA 17}$$

$$b_D = C_3 b_S + C_4(L_S+N) \quad \text{FORMULA 18}$$

It is provided that co-efficient C0, C1, C2, C3, C4 are represented by Formulas 19, 20, 21, 22, 23, and that N is represented by Formula 12 whereas Ka, and Kb are represented by Formulas 25, 26, respectively.

$$C_0 = \frac{L_{wd}+16}{L_{ws}+16} \quad \text{FORMULA 19}$$

$$C_1 = \frac{a_{wd}+K_a(L_{wd}+16)}{a_{ws}+K_a(L_{ws}+16)} \quad \text{FORMULA 20}$$

$$C_2 = K_a\frac{a_{wd}-\frac{(L_{wd}+16)}{(L_{ws}+16)}a_{ws}}{a_{ws}+K_a(L_{ws}+16)} \quad \text{FORMULA 21}$$

$$C_3 = \frac{b_{wd}+K_b(L_{wd}+16)}{b_{ws}+K_b(L_{ws}+16)} \quad \text{FORMULA 22}$$

$$C_4 = K_b\frac{b_{wd}-\frac{(L_{wd}+16)}{(L_{ws}+16)}b_{ws}}{b_{ws}+K_b(L_{ws}+16)} \quad \text{FORMULA 23}$$

$$N = \begin{cases} 16(L_s \geq 8) \\ 2*L_s(L_s<8) \end{cases} \quad \text{FORMULA 24}$$

$$K_a = \frac{500}{116} \quad \text{FORMULA 25}$$

$$K_b = -\frac{200}{116} \quad \text{FORMULA 26}$$

Herein, N means an adjusting value where the input brightness Ls is a low brightness. As described above, from Formulas 16 to 18, the corrected Lab value ($L_D$, $a_D$, $b_D$) can be sought through pluralistic linear equations of the Lab value (Ls, as, bs) having the coefficients $C_0$ to $C_4$ determined by the background color Lab value ($L_{ws}$, $a_{ws}$, $b_{ws}$) and the white color Lab value ($L_{wd}$, $a_{wd}$, $b_{wd}$). Because the operation contents are merely multiplications of fifteen (15) times and divisions of four (4) times for deriving the coefficients $C_0$ to $C_4$ and operation of the adjusting value N as well as multiplications of six (6) times using the coefficients $C_0$ to $C_4$ for conversion of each pixel, the operation time can be improved largely. In addition, operation can be made more accurately because not through multiple conversions.

The conversion parameter output unit 205 calculates coefficients $C_0$ to $C_4$ indicated by Formulas 19 to 23 based on the background color Lab value ($L_{ws}$, $a_{ws}$, $b_{ws}$) detected by the background color detection unit 203 and the white color Lab value ($L_{wd}$, $a_{wd}$, $b_{wd}$) set at the output white color value setting unit 204.

The white color conversion unit 206 converts the respective pixel values (Ls, as, bs) of Lab image data obtained at the input color conversion unit 202 into the white-converted Lab value ($L_D$, $a_D$, $b_D$) through Formulas 16 to 18 in use of the coefficients $C_0$ to $C_4$ derived at the conversion parameter output unit 205.

An output color conversion unit 207 serving as a second color conversion unit converts the Lab image data as the second image data converted by the background removing unit 200 into RGB image data as third image data. In this embodiment, a three-dimensional look-up table is produced in advance for deriving an output RGB value corresponding to a combination of L, a, b of the post-conversion Lab image data, and the output color conversion unit 207 reads out the respective Lab value of the Lab image data and converts them into the corresponding RGB value upon referring to the three-dimensional look-up table. The output color conversion unit 207 outputs the converted and obtained RGB image data to the image output unit 208.

The image output unit 208 serving as an output unit outputs the RGB image data via the output interface 106 and renders the HDD 120 store the data.

Subsequently, referring to the flowchart of FIG. 3, operation of the image processing apparatus 100 according to the embodiment is described.

The image input unit 201 retrieves or inputs RGB image data from the scanner 110 via the input interface 101 at step S301 and renders the RAM 103 memorize the data.

The input color conversion unit 202 converts the RGB image data retrieved at step S301 into Lab image data using the three-dimensional look-up table (step S302).

The background color detection unit 203 at step S303 refers to the Lab image data converted by the input color conversion unit 202 and detects the background color Lab value ($L_{ws}$, $a_{ws}$, $b_{ws}$). Processing in the background color detection unit 203 is described later.

The output white color value setting unit 204 at step S304 sets the white color value ($L_{wd}$, $a_{wd}$, $b_{wd}$). In this embodiment, the output white color value setting unit 204 sets the white color Lab value to (100, 0, 0) equivalent to the white color of the Lab image data.

The background removing unit 200 executes background removal by the white color conversion in the Lab space (step S305). Processing done by the background removing unit 200 is described later.

Next, the output color conversion unit 207 converts the Lab image data converted at step S305 into the RGB image data using the three-dimensional look-up table (step S306).

Finally the image output unit 208 outputs the RGB image data via the output interface 106 and renders the HDD 120 memorize the data (step S307).

Figure 3:
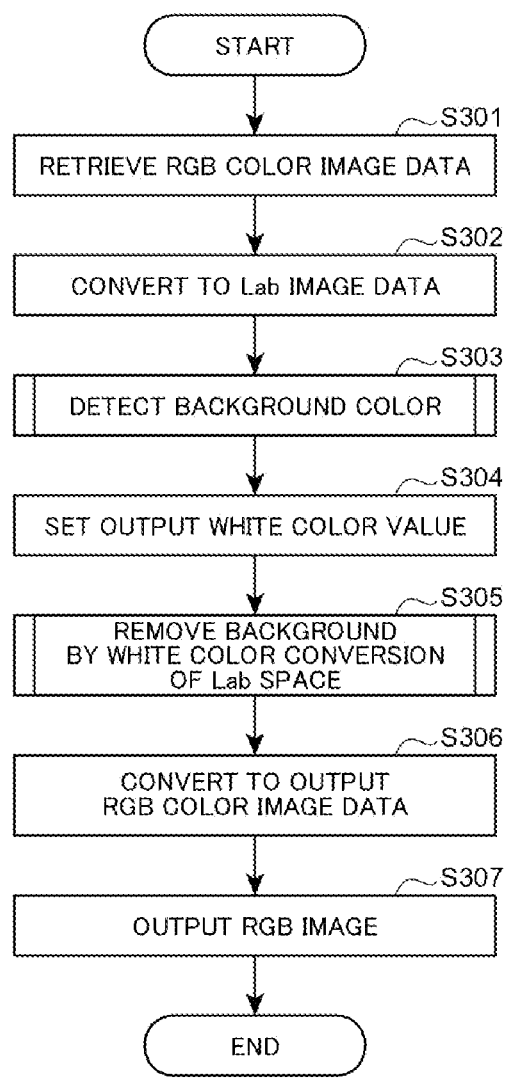
FIG. 3 is a flowchart showing operation of the image processing apparatus according to the first embodiment.
Figure 4:
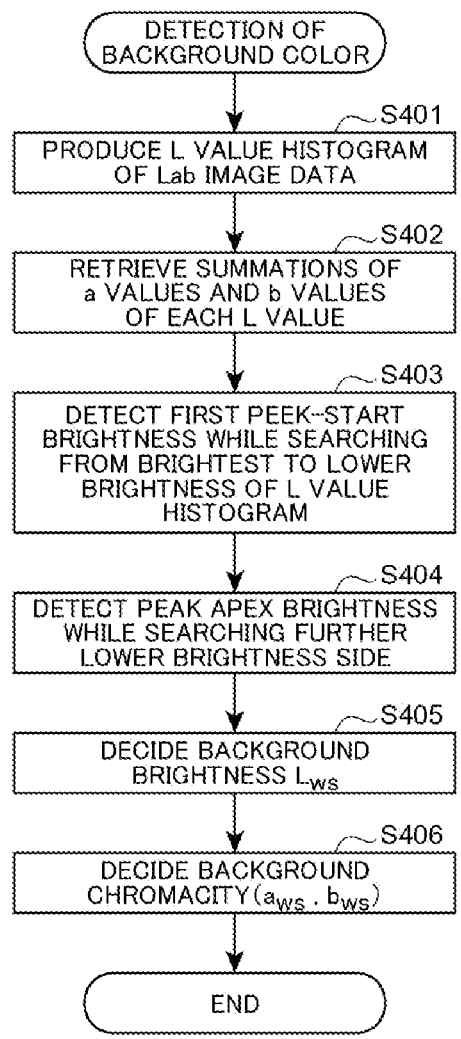
FIG. 4 is a flowchart showing detection operation of background color Lab value by means of a background color detection unit at step S303 in FIG. 3.
Figure 5:
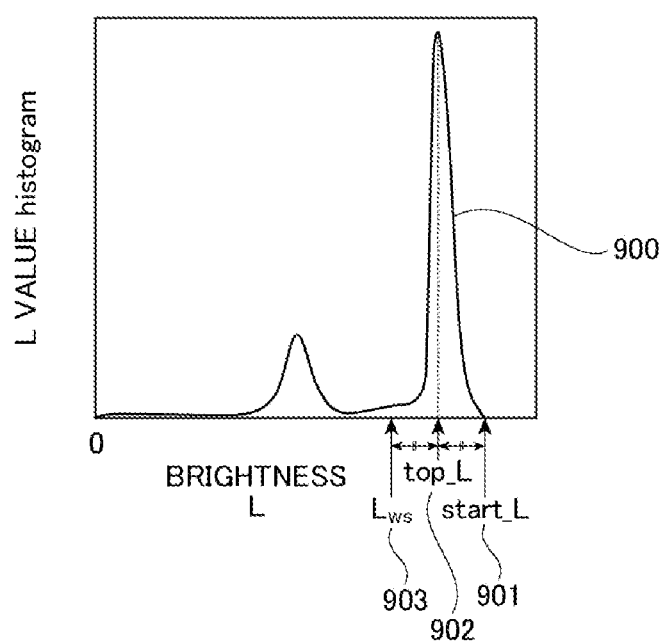
FIG. 5 is a graph showing an example of an L-value histogram produced by means of the background detection unit.

Referring to the flowchart of FIG. 4 and L value histogram example in FIG. 5, detection operation of the background color Lab value ($L_{ws}$, $a_{ws}$, $b_{ws}$) by the background color detection unit 203 at step 303 in FIG. 3 is described.

First, the background color detection unit 203 at step S401 produces L value histogram (histogram [L]) indicating the brightness from the Lab image data converted by the input color conversion unit 202. FIG. 5 is a diagram showing examples of the L value histogram 900 produced by the background detection unit 203.

The background color detection unit 203 checks the Lab value of each pixel in the Lab image data, and retrieves the summation sum_a[L] of a* value of each L value and the summation sum_b[L] of b* value of each L value (step S402).

The background color detection unit 203 subsequently searches from the brightest brightness to a lower brightness side of the L value histogram 900, and detects a first peek start brightness start_L (step S403). The peek start brightness means brightness 901 located at a bottom portion on a higher brightness side of the peek, on a right side in FIG. 5. In this embodiment, a value at which the L value histogram 900 first becomes larger than zero (histogram [L]>0) is set as the peek start brightness where L value taking 100 (L value=100) is gradually reduced.

The background color detection unit 203 further does searching toward a lower brightness side and detects peek apex brightness top_L (step S404). The peek apex brightness means brightness 902 reaching the maximum frequency on a right side in FIG. 5, and in this embodiment, the value at which the L value histogram 900 first becomes histogram [L]<histogram [L+1] is set as the peek apex brightness.

The background color detection unit 203 determines the brightness $L_{ws}$ of the background from the peek start brightness start_L detected at step 403 and the peek apex brightness top_L detected at step 404 (step S405). It is to be noted that the brightness of the pixels located at the background is considered to have a profile of not a single point but a normal distribution, the lowest brightness that the background pixel can have is set as the brightness $L_{ws}$ of the background. With this setting, the entire background pixels having brightness higher than the brightness $L_{ws}$ of the background, can be removed. The bottom of the background brightness on a lower brightness side is considered to exist at a position on a lower brightness side of the peek apex brightness, shifted with a width between the peek start brightness and the peek apex brightness from the peek apex brightness, or namely at a point of brightness 903 in FIG. 5, and therefore, the background detection unit 203 sets a value sought by the following Formula 27 to be the background brightness $L_{ws}$.

$$L_{ws} = \text{top}\_L - (\text{start}\_L - \text{top}\_L) \quad \text{FORMULA 27}$$

The background detection unit 203 seeks at step S406 the chromaticity $a_{ws}$, $b_{ws}$ of the background. In this embodiment, the values of the background chromaticity are set as respective average values of a* value and b* value of the pixels having brightness between the background brightness $L_{ws}$ and the peek start brightness start_L. Accordingly, the background detection unit 203 sets the values sought by the following Formulas 28, 29 to be the the chromaticity $a_{ws}$, $b_{ws}$ of the background, using the L value histogram (histogram[L]) produced at step S401, the summation sum_a[L] of the a* value of each L value and the summation sum_b[L] of the b* value of each L value, respectively obtained at step S402.

$$a_{ws} = \frac{\sum_{l=L_{ws}}^{\text{start}\_L} \text{sum}\_a[l]}{\sum_{l=L_{ws}}^{\text{start}\_L} \text{histogram}[l]} \quad \text{FORMULA 28}$$

$$b_{ws} = \frac{\sum_{l=L_{ws}}^{\text{start}\_L} \text{sum}\_b[l]}{\sum_{l=L_{ws}}^{\text{start}\_L} \text{histogram}[l]} \quad \text{FORMULA 29}$$

From the operations described above, the background color Lab value ($L_{ws}$, $a_{ws}$, $b_{ws}$) can be detected from the Lab image data obtained upon conversion at the input color conversion unit 202.

Figure 6:
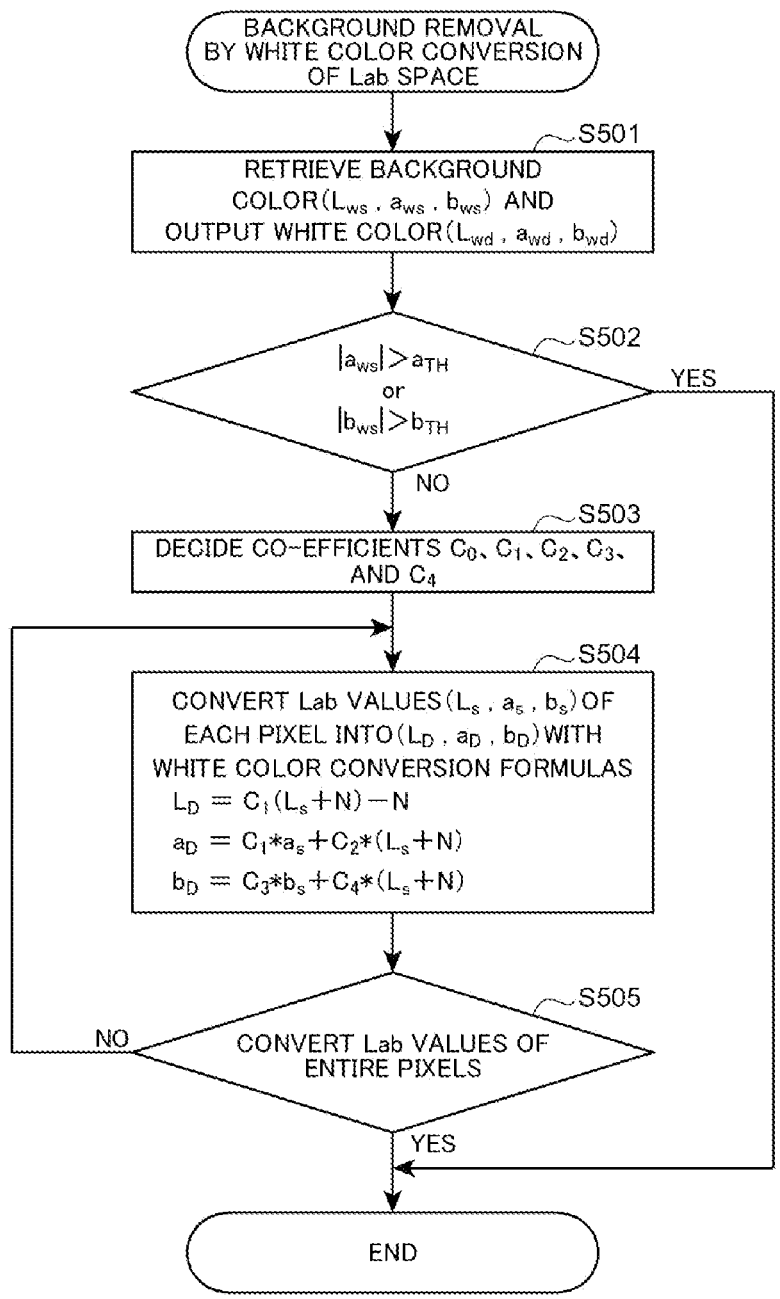
FIG. 6 is a flowchart showing background color removing processing with a white value conversion in the Lab space by means of a background removing unit at step S305 in FIG. 3.

Next, referring to the flowchart of FIG. 6, background removing operation through the white color conversion of the Lab space done by the background removing unit 200 at step S305 in FIG. 3 is described.

At step S501, the conversion parameter output unit 205 retrieves the background color Lab value ($L_{ws}$, $a_{ws}$, $b_{ws}$) detected at step S303 in FIG. 3 and the white color Lab value ($L_{wd}$, $a_{wd}$, $b_{wd}$) set at step S304.

The conversion parameter output unit 205 refers to the chromaticity ($a_{ws}$, $b_{ws}$) of the background color obtained at step S501, and ends the processing in a case when the absolute value $|a_{ws}|$ of the value $a_{ws}$ is greater than a prescribed threshold value $a_{TH}$ or when the absolute value $|b_{ws}|$ of the value $b_{ws}$ is greater than a prescribed threshold value $b_{TH}$ (step S502 Yes). This is based on a judgment that, where a color judged as the background color has a colorfulness exceeding a prescribed threshold value, the background color should not be deleted as color information. On the other hand, if the absolute value $|a_{ws}|$ of the value $a_{ws}$ is equal to or less than a prescribed threshold value $a_{TH}$ or if the absolute value $|b_{ws}|$ of the value $b_{ws}$ is equal to or less than a prescribed threshold value $b_{TH}$ (step S502 No), the processing done by the conversion parameter output unit 205 goes to step S503.

The conversion parameter output unit 205 derives the coefficients $C_1$ to $C_4$ indicated by Formulas 20 to 23 in use of the background color Lab value ($L_{ws}$, $a_{ws}$, $b_{ws}$) and the white color Lab value ($L_{wd}$, $a_{wd}$, $b_{wd}$), obtained at step S501.

The white color conversion unit 206 of the background removing unit 200 uses the coefficients $C_1$ to $C_4$ derived at step S503 and converts the respective pixel values ($L_s$, $a_s$, $b_s$) of the Lab image data converted at step S302 into the white-converted Lab value ($L_D$, $a_D$, $b_D$) through Formulas 16 to 18 (step S504).

If the Lab value of all pixels is converted (step S505 Yes), the processing done by the background removing unit 200 ends. On the other hand, if there is any unprocessed pixel (step S505 No), the processing done by the background removing unit 200 returns to step S504, and the Lab value conversion of a subsequent pixel is executed.

According to the above operations, the image processing apparatus produces the Lab image data subject to the white conversion from the background color Lab value ($L_{ws}$, $a_{ws}$, $b_{ws}$) to the white color Lab value ($L_{wd}$, $a_{wd}$, $b_{wd}$).

Figure 8:
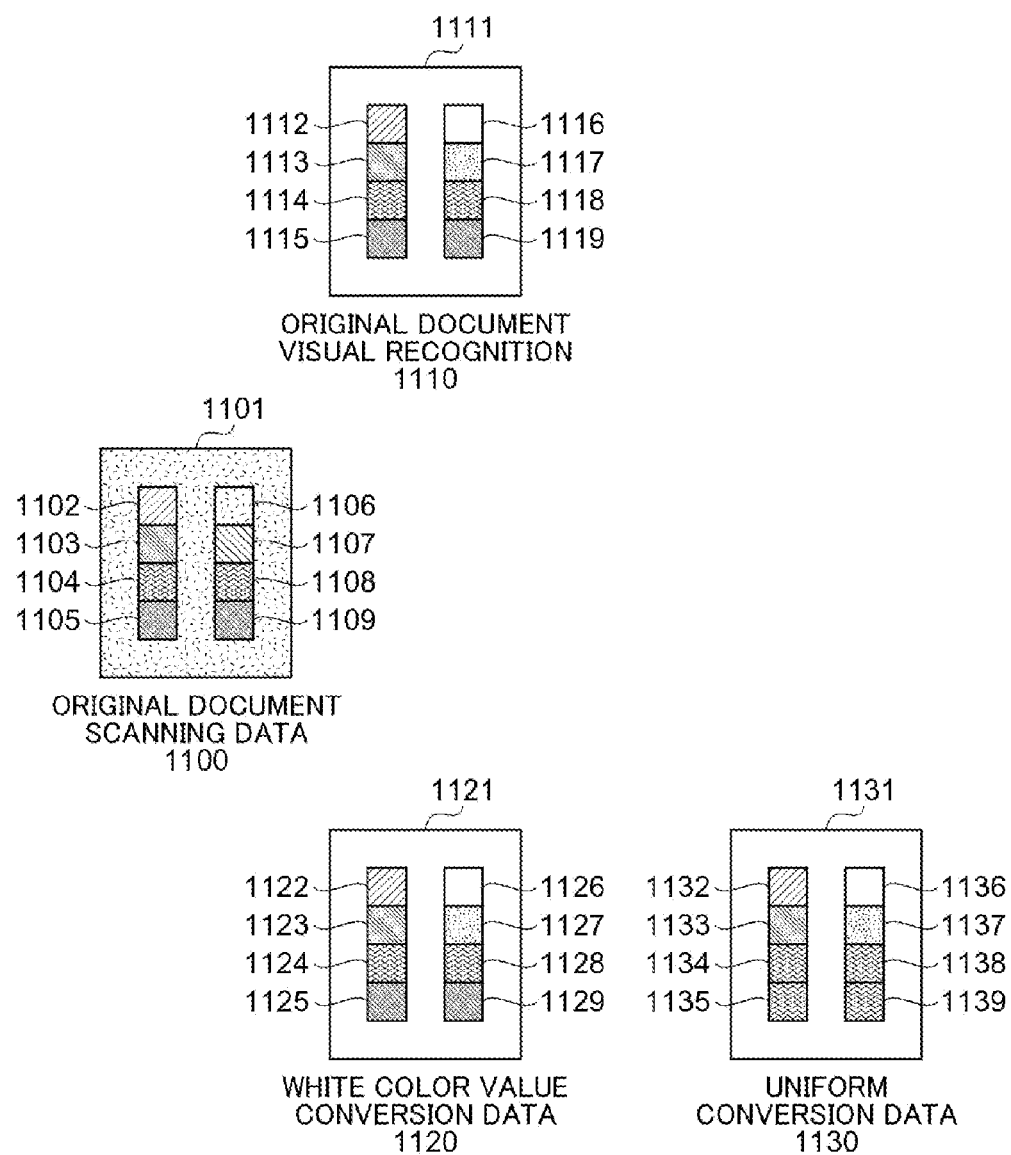
FIG. 8 is a diagram showing processing results with respect to image data.
Figures 9, 10:
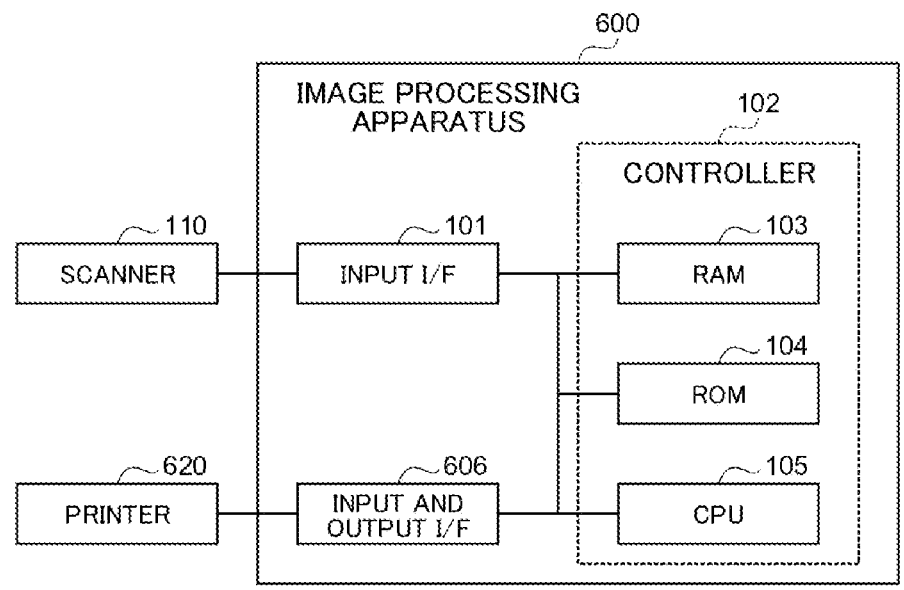
FIG. 9 is a table showing specific examples of Lab values of respective portions in FIG. 8.
FIG. 10 is a schematic diagram illustrating the entire structure of an image processing apparatus according to the a second embodiment of the invention.

FIGS. 7(*a*) to 7(*c*) are diagrams showing examples of changes in color space between pre-processing and post-processing with respect to background removing processing using the white color value conversion according to the first embodiment and with respect to background removing processing done by a conventional uniform conversion of a Lab value; FIG. 8 is a diagram showing processing results with respect to image data; FIG. 9 is a table showing specific examples of Lab values of respective portions in FIG. 8.

FIG. 7(*a*) shows changes in color space by the white conversion according to the first embodiment, and is a diagram in which a vertical axis indicates brightness L and a horizontal axis indicates chromaticity b. In this example, the color space range 1001 of an image whose foundation is tinted in lightly yellow, read by the scanner 110, is changed to the color space range 1002 of post-white color value conversion. A point 1003 is a foundation of the original document scanning data, which is corresponding to the color shown by the reference number 1101 of the original document scanning data 1100 in FIG. 8. For example, as shown in FIG. 9, it is set as Lab=(90, 0, 8).

A point 1004 indicates an achromatic color of the brightest brightness in the color space, or namely, a white color point. A point 1005 is an achromatic color of the least bright brightness in the color space, or namely, a black color point. A line 1006 is a line segment coupling the foundation color 1003 with the black color point 1005, and a gradation region of gray tinted in lightly yellow. Patches or segments 1106 to 1109 in FIG. 8 are patches of the color located on the line 1006, and are a gradation tinted in lightly yellow likewise values as shown in FIG. 9. A line 1007 is a line segment coupling the white color point and the black color point, or namely an axis of achromatic color. The patches 1102 to 1105 in FIG. 8 are patches of the color located on this line 1007, and are an achromatic color gradation likewise values as shown in FIG. 9.

Herein, even where the background is in a color of low colorfulness, human's eye in general has a specific character to recognize the background as a white color and to perceive the other colors as colors correlative to the background color. In such a case, likewise an original document visual recognition pattern 1110, the background 1111 corresponding to the background 1101 in lightly yellow is recognized as white, and a gradation of gray tinted in lightly yellow 1106 to 1109 are recognized as a gradation of an achromatic color 1116 to 1119; a gradation of an achromatic color 1102 to 1105 is recognized as a gradation of gray tinted in lightly blue 1112 to 1115. To produce output images, it is therefore required to have an output equivalent to the special character of human's visual capability.

As shown in FIG. 7(*a*), in the white color value conversion, it is converted as to extend the whole color space at the same time to the conversion from the foundation color 1003 to the white color 1004. The axis of gray tinted in lightly yellow of the line 1006 is changed to the axis of the achromatic color of the line 1007, and the points on the axis of the achromatic color of the line 1007 are changed to the axis of gray tinted in blue of the line 1008. As shown in a white color conversion data 1120 in FIG. 8, the background 1101 is converted to a background 1121; the gradation of gray tinted in lightly yellow 1106 to 1109 is converted to a gradation of the achromatic color 1126 to 1129; the gradation of an achromatic color 1102 to 1105 is converted to a gradation of gray tinted in lightly blue 1122 to 1125. The image processing apparatus therefore can realize natural color conversion in matching human's visual capability (see, e.g., FIG. 9 as specific examples of Lab values).

On the other hand, a conventional method for uniformly converting Lab values, as shown in FIG. 7(*b*), brings, as a correction result, a color space range 1011 in which a color space range 1009 is moved parallel in a direction that the chromaticity becomes the achromatic color, where the color space range 1009 is formed by extending the foundation color 1003 to a point 1011 having an unchanged chromaticity and the maximum brightness. In such a case, though the foundation color 1003 is corrected to the white color 1004, the chromaticity other than the foundation color changes uniformly, likewise that the black color point 1005 moves to a point 1012 shifted in a blue-taste direction. As shown in FIG. 7(*c*), the line 1006 serving as the gradation of gray tinted in lightly yellow is converted to a line 1013 coupling the white color point 1004 with the black color point 1012 of a blue-tasted. As shown with the uniform conversion data 1130 in FIG. 8, though the background 1101 is converted to the white color background 1131, the gradation of gray tinted in lightly yellow 1106 to 1109 is converted into a gradation from the white color point to black tinted in blue 1136 to 1139 whereas the gradation of the achromatic color 1102 to 1105 is converted to the gradation from white tinted in lightly blue to black tinted in lightly blue 1132 to 1135, so that it brings a result different from the original document visual recognition pattern 1110 (see, e.g., FIG. 9 as specific examples of Lab values).

As described above, according to the first embodiment, the background color removing processing can be performed without any occurrence of distortions and deviations in color space and without losing the color balance.

Second Embodiment

An image processing apparatus 600 according to the second embodiment has a structure mostly the same as that in the image processing apparatus 100 according to the first embodiment. In a description for this embodiment, the same portions are given with the same reference numbers, and a duplicated explanation is omitted for the sake of simplicity.

FIG. 10 is a schematic diagram illustrating the entire structure of the image processing apparatus 600 according to the second embodiment. The image processing apparatus 600 includes an input and output interface 606 instead of the output interface 106 formed in the image processing apparatus 100 according to the first embodiment.

The input and output interface 606 is connected to a printer 620 as an external apparatus via electric signal lines such as, e.g., LAN cables and USB cables, retrieves printer profile information describing printer profiles used in the printer 620, and outputs the Lab image data to the printer 620. The printer 620 is an electrophotographic type image forming apparatus, converts the Lab image data output from the input and output interface 606 into CMYK image data based on the printer profile, and forms images based on the CMYK image data on a medium.

Figure 11:
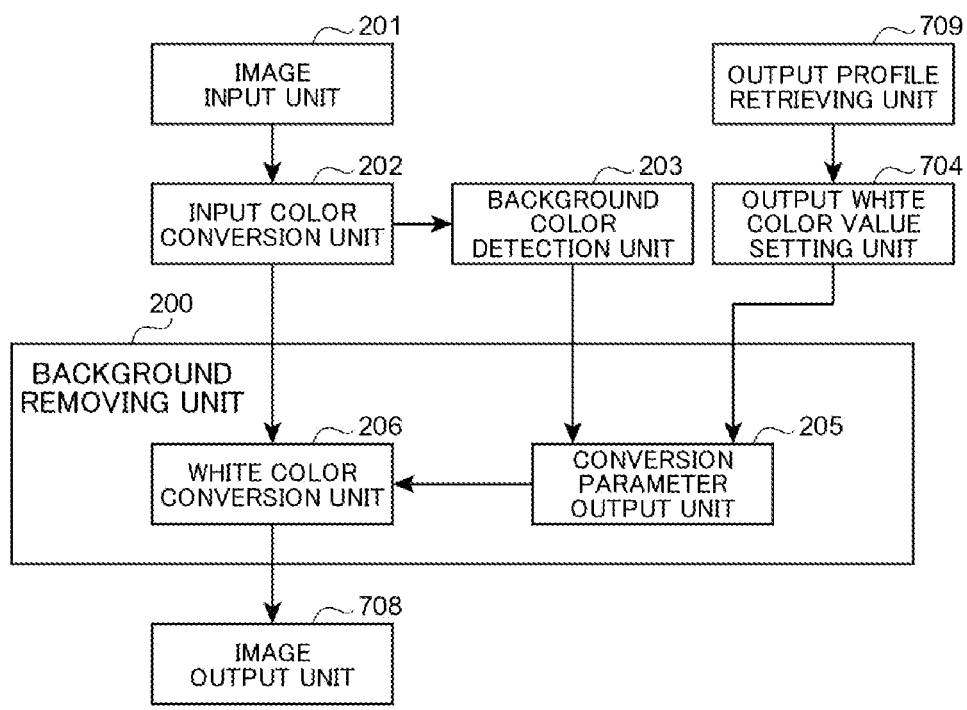
FIG. 11 is a functional block diagram showing functions of the image processing apparatus according to the second embodiment.

FIG. 11 is a functional block diagram showing functions of the image processing apparatus 600 according to the second embodiment. Communication mechanisms at each unit and operation for writing control and image processing are realized by CPU 105 in the controller 102 upon execution of the programs stored in the ROM 104 while rendering the RAM 103 a working memory. It is to be noted that the image input unit 201, the input color conversion unit 202, the background color detection unit 203, the background removing unit 200, the conversion parameter output unit 205, and the white color conversion unit 206 are the same as what are described in the first embodiment, so that a duplicated explanation here is omitted for the sake of simplicity.

An output profile retrieving unit 709 retrieves, via the input and output interface 606, the printer profile information in which printer profiles used in the printer 620 are described.

An output white color value setting unit 704 sets a white color Lab value ($L_{wd}$, $a_{wd}$, $b_{wd}$) as a conversion result where the background color Lab value detected at the background color detection unit 203 is converted at the background removing unit 200. In this embodiment, the output white color value setting unit 704 refers to the printer profile information retrieved at the output profile retrieving unit 709, and sets the Lab value defined as white color in the printer profile described in the information as the white color Lab value ($L_{wd}$, $a_{wd}$, $b_{wd}$). The output white color value setting unit 704 outputs the set white color Lab value to the conversion parameter output unit 205 of the background removing unit 200.

The image output unit 708 outputs the Lab image data converted by the background removing unit 200 to the printer 620 via the input and output interface 606. The Lab image data outputted from the image output unit 708 are converted into CMYK image data based on the printer profile, and forms images based on the CMYK image data on a medium.

Figure 12:
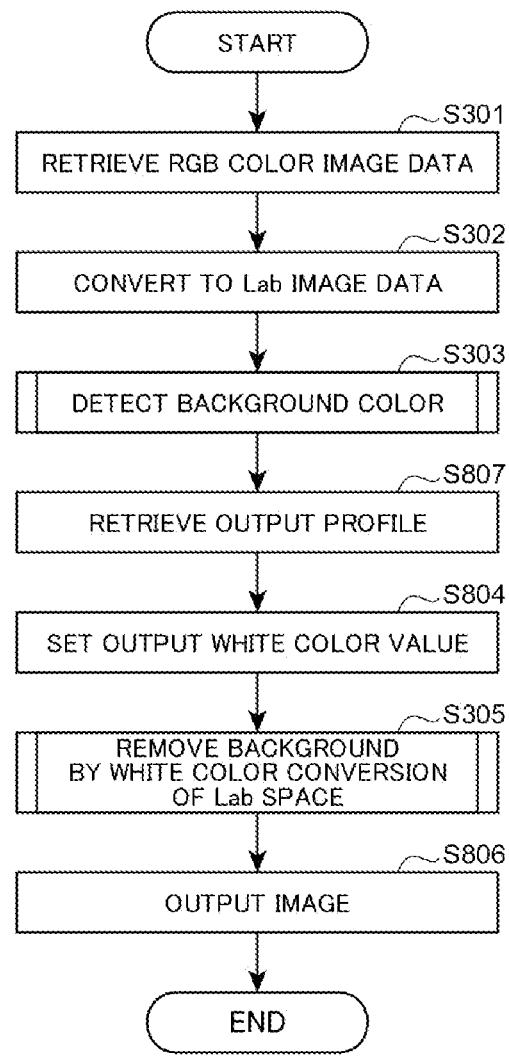
FIG. 12 is a flowchart showing operation of the image processing apparatus according to the second embodiment.

Next, referring to FIG. 12, operation of the image processing apparatus 600 according to the second embodiment is described. It is to be noted that processings at steps S301, S302, S303, and S305 are the same as those described in the flowchart in FIG. 3 in the first embodiment, and a duplicated explanation here is omitted for the sake of simplicity.

At step S807, the output profile retrieving unit 709 retrieves printer profile information from the printer 620 via the input and output interface 606.

The output white color value setting unit 704 sets the white color Lab value ($L_{wd}$, $a_{wd}$, $b_{wd}$). In this embodiment, the output white color value setting unit 704 sets the Lab value defined as white color in the printer profile described in the information retrieved at step S807 as the white color Lab value ($L_{wd}$, $a_{wd}$, $b_{wd}$) (step S804).

The image output unit 708 at step S806 outputs Lab image data converted at step S305 to the printer 620 via the input and output interface 606.

As described above, according to the second embodiment, in addition to the advantages according to the first embodiment, the background color removing processing can be performed without any occurrence of distortions and deviations in color space and without losing the color balance, even where an output device such as, e.g., a printer uses an arbitrary profile.

Although in the second embodiment, a method retrieving from, e.g., external PC or scanner is described as a method for retrieving multicolor image data, this invention is not limited to the method and is applicable to photocopiers incorporating a scanner, facsimile machines, MFPs (Multi-Function Peripherals) without having any external interface. Although in the second embodiment, a feature of outputting to, e.g., an external HDD or printer is described as an outputting method of the color image data, this invention is not limited to this and can have a structure using output devices such as monitors, etc., as well as a structure incorporating an output device without having any external interface.

Although in the second embodiment, a method deriving the white color conversion formulas in the L*a*b* space calculated based on the white color ratio in the XYZ color space is described, those conversion formulas are not limited to those as far as adjustable of the whole color space based on the white color, and for example, this invention may use a method deriving the white color conversion formulas in the L*a*b* space based on the white color conversion of Bladford. This invention may also use a method to memorize, in advance, conversion values corresponding to the memory input values as a look-up table in lieu of using the conversion formulas.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. An image processing apparatus comprising:
   an image input unit configured to input color image data;
   a first color conversion unit configured to convert the input color image data into first image data of an L*a*b color space having independent brightness and chromaticity components;
   a background color detection unit configured to detect a background color component, $L_{ws}$, $a_{ws}$, $b_{ws}$, from the converted first image data of the L*a*b color space by:

producing an L value histogram (histogram [L]) indicating brightness from the converted first image data,
retrieving a summation, sum a[L], of an a* value of each L value and a summation, sum b[L], of a b* value of each L value,
detecting a peak start brightness, start L,
detecting a peak brightness, top L,
seeking a background brightness, $L_{ws}$, by the peak start brightness, start L, the peak brightness, top L, and a formula, $L_{ws}$=top_L-(start_L-top_L), and seeking chromaticity $a_{ws}$, $b_{ws}$ by formulas, $$a_{ws} = \frac{\sum_{l=L_{ws}}^{start\_L} \text{sum\_a}[l]}{\sum_{l=L_{ws}}^{start\_L} \text{histogram}[l]}, b_{ws} = \frac{\sum_{l=L_{ws}}^{start\_L} \text{sum\_b}[l]}{\sum_{l=L_{ws}}^{start\_L} \text{histogram}[l]},$$

respectively;
a background removing unit configured to convert, based on a white value conversion parameter derived based on a ratio of the background color corresponding to the background color component to a prescribed reference white color in the L*a*b color space, the first image data into second image data having the background color in white;
a second color conversion unit configured to convert the second image data of the L*a*b color space into third image data of a prescribed color space; and
an output unit configured to output the converted third image data of the prescribed color space.

2. The image processing apparatus according to claim 1, wherein the background removing unit includes a derivation unit for deriving the white value conversion parameter based on the ratio of the background color corresponding to the background component to the prescribed reference white color in the L*a*b color space, and a white color conversion unit for converting the first image data into second image data having the background color in white based on the white value conversion parameter.

3. The image processing apparatus according to claim 2, wherein the white color conversion unit calculates the second image data using pluralistic linear equations into which the white value conversion parameter enters.

4. The image processing apparatus according to claim 2, wherein the derivation unit derives the white value conversion parameter using pluralistic linear equations to which data of the background component and the prescribed reference white color are entered.

5. The image processing apparatus according to claim 2, wherein the derivation unit derives the white value conversion parameter while the chromaticity component is judged as smaller than a certain threshold value.

6. The image processing apparatus according to claim 1, wherein the first color conversion unit converts the color image data into the first image data using a three-dimensional look-up table.

7. The image processing apparatus according to claim 1, wherein the background detection unit assumes the background color component from a brightness histogram of the first image data.

8. The image processing apparatus according to claim 1, wherein the reference white color is an achromatic color of the brightest brightness.

9. The image processing apparatus according to claim 1, wherein the reference white color is white set in a profile of an output device.

10. The image processing apparatus according to claim 1, wherein the second color conversion unit converts the second image data into the third image data using a three-dimensional look-up table.

11. The image processing apparatus according to claim 1, wherein the prescribed color space is either of RGB color space or CMYK color space.

12. The image processing apparatus according to claim 1, further comprising an image reading unit for reading color image from an original document, wherein the image input unit inputs the color image read with the image reading unit.

13. The image processing apparatus according to claim 1, further comprising an image forming unit for forming, on a medium, the image based on the third image data outputted from the output unit.

* * * * *